UNITED STATES PATENT OFFICE.

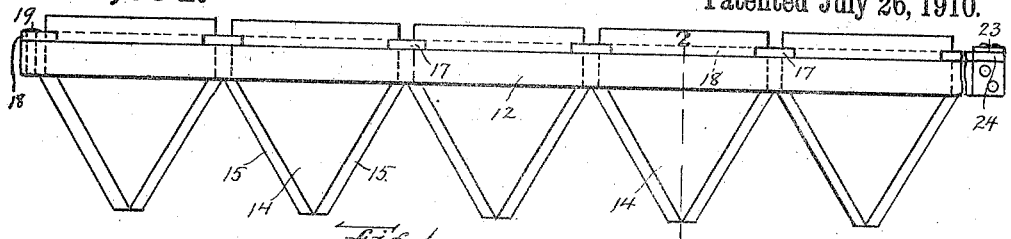
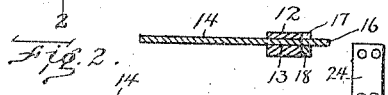
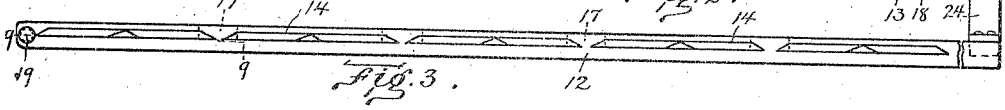
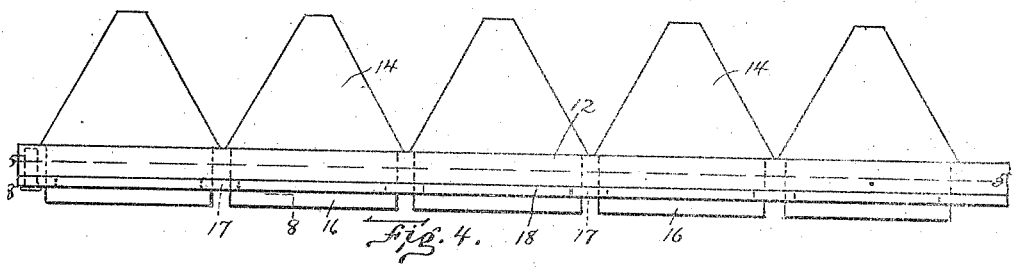
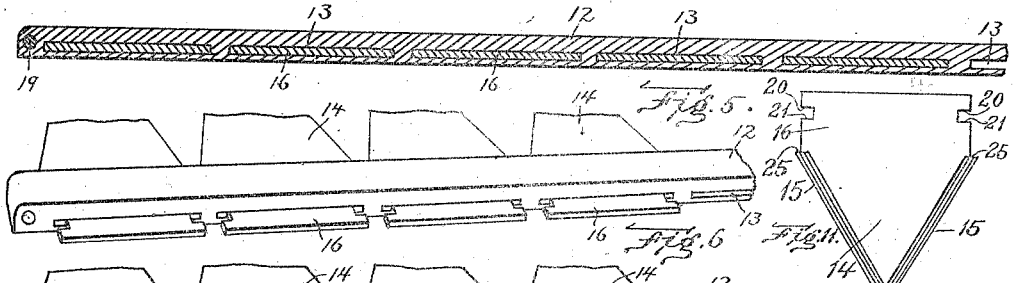
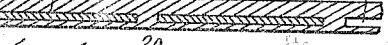
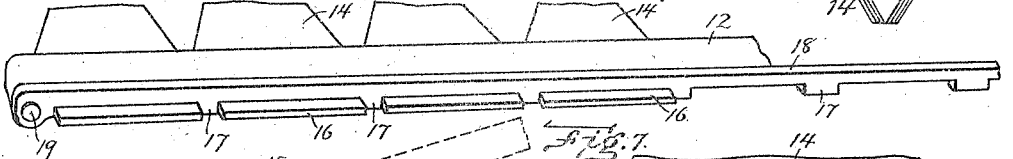
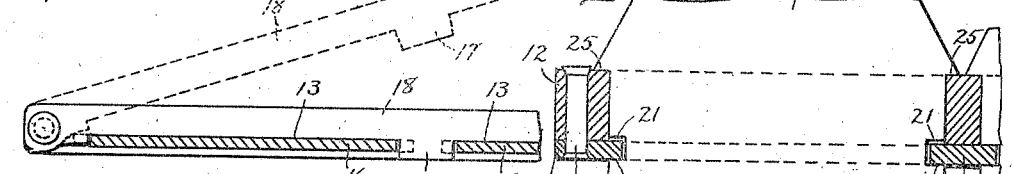

JOHN H. POOLE, OF BROCKTON, AND ALFRED D. ABBENZELLER, OF RANDOLPH, MASSACHUSETTS, ASSIGNORS, BY DIRECT AND MESNE ASSIGNMENTS, TO BROCKTON MOWING MACHINE CUTTER BAR COMPANY, OF BROCKTON, MASSACHUSETTS, A CORPORATION OF MASSACHUSETTS.

CUTTER-BAR.

965,654.  Specification of Letters Patent.  Patented July 26, 1910.

Application filed June 9, 1909. Serial No. 501,059.

*To all whom it may concern:*

Be it known that we, JOHN H. POOLE, of Brockton, in the county of Plymouth and State of Massachusetts, and ALFRED D. ABBENZELLER, of Randolph, in the county of Norfolk and State of Massachusetts, have invented certain new and useful Improvements in Cutter-Bars, of which the following is a specification.

This invention relates to a reciprocating cutter bar for a mowing machine, the cutter bar being provided with a series of knives which coöperate with fixed fingers carried by a finger bar on which the cutter bar reciprocates.

The invention has for its object to provide an improved construction of a cutter bar and its knives whereby the knives may be simultaneously locked to the cutter bar and simultaneously released, so that any knife may be removed to be sharpened or replaced by another with the minimum expenditure of time and labor.

The invention consists in the improvements which we will now proceed to describe and claim.

Of the accompanying drawings, forming a part of this specification,—Figure 1 represents a top plan view of a cutter bar and a series of knives embodying our invention. Fig. 2 represents a section on line 2—2 of Fig. 1. Fig. 3 represents a front edge view of the cutter bar and knives. Fig. 4 represents a bottom plan view of the cutter bar and knives shown in Fig. 1. Fig. 5 represents a section on line 5—5 of Fig. 4. Fig. 6 represents a perspective view showing a portion of the cutter bar inverted, the knife-locking means being removed. Fig. 7 represents a view similar to Fig. 6, showing the knife-locking means in place. Fig. 8 represents a section on line 8—8 of Fig. 4. Fig. 9 represents a section on line 9—9 of Fig. 3. Fig. 10 represents an end elevation of the cutter bar. Fig. 11 represents a plan view of one of the knives detached.

The same reference characters indicate the same parts in all the figures.

In the drawings,—12 represents a cutter bar which is here shown as rectangular in cross section, and having continuous flat upper and lower sides, the latter being adapted to slide as usual in contact with the finger bar of a mowing machine. We have not shown the means for reciprocating the cutter bar, and it will be understood that these may be of the usual or any suitable character. Owing to the upper and lower sides of the cutter bar 12 being flat and continuous, the said bar is adapted to slide in the usual manner in contact with the finger bar of a mowing machine, without wearing the bearings in such manner as would be caused by any set in pieces, screw holes, pivots or the like. The cutter bar is provided with a series of slots 13 extending entirely through it from its front to its rear edge, these slots being formed to receive and closely fit the shanks of the knives hereinafter referred to.

The knives 14 have the usual oblique cutting edges 15 adapted to coöperate with the fingers of the usual finger bar in cutting standing grass. Each knife is provided with a shank 16 formed to enter and snugly fit one of the slots 13, the shanks being preferably so proportioned relatively to the width of the cutter bar that when the knives are in position, the rear ends of the shanks project from the rear edge of the cutter bar, as shown in the drawings, so that when the knives are released or unlocked, any knife may be removed by tapping the rear end of its shank with a hammer, provision being thus made for conveniently dislodging and removing the knives and overcoming any difficulties that may attend such removal owing to rust or corrosion of the contacting surfaces of the slots 13 and shanks 16.

The cutter bar is provided with a series of locking tongues 17 which are formed on a bar 18. Said bar is pivoted at 19 to the cutter bar 12 at the rear vertical edge thereof, the arrangement being such that when the bar 18 is swung on its pivot, it moves to and from a position along the edge of the cutter bar 12 and the tongues 17 are moved crosswise of the plane of the series of slots 13. When the locking bar 18 is in its closed position alongside the cutter bar 12, the locking tongues 17 project across portions of the slots 13 and engage shoulders formed on the knife shanks 16, thus locking the knives in place. When the locking bar 18 is displaced, as indicated by dotted lines in Fig. 8, the tongues 17 are withdrawn simultaneously from engagement with the knife shanks, the knives being therefore simultaneously released, so that each is free to be ejected from the cutter bar.

The knife shanks 16 are provided with shoulders formed to engage the locking tongues 17, the preferred formation being that shown in Fig. 11, the tongue-engaging shoulders being the sides 20 and 21 of recesses formed in the opposite edges of the knife shanks 16. Said recesses are formed to receive portions of the locking tongues 17, as indicated in Figs. 6, 8, and 9.

It will be seen that when the locking tongues are in their operative position, they prevent either forward or backward movement of the knives, and that when they are removed from their operative position, they simultaneously release the knives. The arrangement here shown is such that each locking tongue is movable in a space between two adjacent knife shanks, so that each tongue is instrumental in locking two adjacent shanks. The close sliding fit of the shanks in the slots 13 insures a firm support of the knives against displacement in any direction excepting lengthwise. The locking tongues and shoulders prevent lengthwise displacement of the knives when the locking tongues are in place.

It will be understood that in Figs. 4, 5, 6, 7, and 8, the cutter bar is shown inverted. When the cutter bar is in its operative position, the knife shanks are above the locking bar 18, the tongues 17 being movable downwardly out of engagement with the knife shanks.

In Fig. 10, we show the swinging end of the locking bar 18 provided with a notch 22 adapted to receive a spring latch 23 which is secured to an arm 24 attached to the cutter bar, said latch being adapted to secure the locking bar in its operative position.

We provide the base of each knife with outwardly projecting shoulders 25 adapted to bear on the front side of the cutter bar, and limit the rearward movement of the knife shanks into the cutter bar, so that the knives are rigidly supported by the cutter bar against rearward displacement, and are prevented from exerting pressure on the locking bar tending to spring the same rearwardly. The inner sides 21 of the recesses in the knife shanks do not necessarily bear upon the locking tongues, so that the recesses in the shanks may be of considerably greater width than the thickness of the locking tongues, if desired. The shoulders 25 are at the inner ends of the oblique cutting edges of the knives, so that said cutting edges practically meet at the front side of the cutter bar.

We do not claim herein the structure of the cutter bar described excepting where the structure includes the shoulders at the sides of the knife shanks, which shoulders are engaged by the tongues of the locking bar. Claims not limited to such shoulders are embraced in our application Serial No. 523,385, filed October 19, 1909.

We claim:

1. A cutter bar having a series of transverse slots open at the front side of the bar, a series of knives having shanks formed to enter said slots, and provided with tongue-engaging shoulders, and a series of connected locking tongues movable crosswise of the plane of the series of slots and adapted to engage said shoulders.

2. A cutter bar having a series of transverse slots open at the front side of the bar, a series of knives having shanks formed to enter said slots, and shoulders formed to bear on the front side of the cutter bar and limit the rearward movement of the knife shanks into the slots, and a series of connected locking tongues movable crosswise of the plane of the series of slots, the said shanks being provided with shoulders adapted to engage the locking tongues to prevent forward movement of the knives out of the slots.

3. A cutter bar having a series of transverse slots open at the front side of the bar, a series of knives having shanks formed to enter said slots, said shanks having recesses which form tongue-engaging shoulders, the shanks being separated from each other by intermediate spaces, and a locking bar hinged to the cutter bar and provided with a series of locking tongues movable crosswise of the slots and arranged to enter said spaces and recesses, each tongue being adapted to engage shoulders on two adjacent knife shanks.

In testimony whereof we have affixed our signatures, in presence of two witnesses.

JOHN H. POOLE.
ALFRED D. ABBENZELLER.

Witnesses:
C. F. BROWN,
P. W. PEZZETTI.